(12) United States Patent
Marchal

(10) Patent No.: US 7,667,585 B2
(45) Date of Patent: Feb. 23, 2010

(54) METHOD AND DEVICE FOR IMPROVING VISIBILITY IN A VEHICLE

(75) Inventor: Dominique Marchal, Vallorbe (CH)

(73) Assignee: Robert Bosch GmbH, Stuttgart (DE)

( * ) Notice: Subject to any disclaimer, the term of this patent is extended or adjusted under 35 U.S.C. 154(b) by 212 days.

(21) Appl. No.: 10/593,144

(22) PCT Filed: Jan. 17, 2005

(86) PCT No.: PCT/EP2005/050170

§ 371 (c)(1),
(2), (4) Date: May 14, 2007

(87) PCT Pub. No.: WO2005/090123

PCT Pub. Date: Sep. 29, 2005

(65) Prior Publication Data

US 2007/0211484 A1     Sep. 13, 2007

(30) Foreign Application Priority Data

Mar. 18, 2004    (DE) .................. 10 2004 013 252

(51) Int. Cl.
*B60Q 1/26* (2006.01)

(52) U.S. Cl. .................... 340/468; 340/425.5; 340/438; 340/555; 315/82

(58) Field of Classification Search .......... 340/555–557, 340/438, 436, 425.5, 902, 468, 458, 935, 340/936, 937; 362/487, 507; 315/82, 83, 315/77

See application file for complete search history.

(56) References Cited

U.S. PATENT DOCUMENTS

| 6,067,110 | A | 5/2000 | Nonaka et al. |
| 6,967,569 | B2 * | 11/2005 | Weber et al. ............... 340/436 |
| 7,012,551 | B2 * | 3/2006 | Shaffer ...................... 340/935 |
| 7,319,805 | B2 * | 1/2008 | Remillard et al. .......... 385/147 |
| 2002/0097146 | A1 | 7/2002 | Harris |
| 2003/0045984 | A1 | 3/2003 | Horii et al. |
| 2004/0114381 | A1 * | 6/2004 | Salmeen et al. ............ 362/465 |
| 2004/0252516 | A1 | 12/2004 | Brun et al. |

FOREIGN PATENT DOCUMENTS

| DE | 39 03 501 | 8/1989 |
| DE | 40 32 927 | 4/1992 |
| DE | 197 31 754 | 2/1999 |
| DE | 101 26 492 | 12/2002 |
| DE | 102 27 170 | 1/2004 |
| EP | 1 433 655 | 6/2004 |
| EP | 1 506 893 | 2/2005 |
| GB | 2 395 390 | 5/2004 |
| JP | 11-016099 | 1/1999 |
| JP | 11 208367 | 11/1999 |
| JP | 2002 274258 | 1/2003 |

* cited by examiner

*Primary Examiner*—Anh V La
(74) *Attorney, Agent, or Firm*—Kenyon & Kenyon LLP

(57) ABSTRACT

A method and a device for improving the visibility in a motor vehicle, at least one infrared sensor of the motor vehicle producing a sensor signal when a person is situated in the area illuminated by the light source, and the light source being controlled dependent on the sensor signal.

17 Claims, 2 Drawing Sheets

METHOD AND DEVICE FOR IMPROVING VISIBILITY IN A VEHICLE

FIELD OF THE INVENTION

The present invention relates to a method and a device for improving visibility in a motor vehicle, as well as to its application in a night vision system for a motor vehicle.

BACKGROUND INFORMATION

In German Patent Application No. DE 40 32 927, a device is described for improving visibility conditions in a motor vehicle. Here, the image acquired by an infrared-sensitive camera is visually superposed with a display device, formed as a head-up display, as a virtual image of the exterior landscape, and is displayed to the driver. In addition, at least one source of radiation having an infrared portion is provided for the irradiation of the area perceived visually by the driver in the direction of travel.

Such night vision systems (night view, or NV systems), as described in German Patent Application No. DE 40 32 927, based on light having wavelengths in the near-infrared (NIR) wavelength range, illuminate the area in front of a motor vehicle using infrared headlamps (near-infrared headlamps, or NIR headlamps), in general having a high-beam characteristic. Under certain conditions, the NIR radiation, which is invisible for human beings and most animals, can harm the eyes of humans and animals situated within the range of action of such an NIR headlamp. In order to avoid such damage, it is conceivable to calculate minimum distances for particular radiation strengths between NIR headlamps and the eye that must not be undershot, and that can for example be ensured through constructive measures.

Besides constructive measures, from German Patent Application No. DE 101 26 492 an alternative method is described to prevent damage to traffic participants by NIR light. A method is provided in which laser light having a wavelength outside the visible spectrum is radiated only if the motor vehicle is in motion. Furthermore, it is known to activate NIR in headlamps beginning only at a certain minimum speed, for example 30 km/h. A disadvantage of this method is that the night vision function of a night vision system is not available when the motor vehicle is at a standstill and/or is traveling slowly, although here as well situations can occur in which the night vision function would be useful. For example, a night vision function would be useful when traveling slowly on off-road paths or on narrow side streets. Furthermore, frequent switching on and off of the NIR headlamps has an adverse effect on their life span. In particular in a stop-and-go situation, and/or traffic situations in the vicinity of the minimum speed, a high degree of strain is placed on the NIR headlamps. This can have the result that the user acceptance of such a night vision system is reduced due to this limited availability.

In the above-cited German Patent Application Nos. DE 40 32 927 and DE 101 26 492, no indications are found of a damage-free method for improving visibility in a motor vehicle that simultaneously operates with a high degree of availability.

SUMMARY OF THE INVENTION

The method described in the following for improving visibility in a motor vehicle has the advantage that it provides a damage-free method, which simultaneously operates with a high degree of availability, for improving the visibility in a motor vehicle. Particularly advantageously, the method contributes to the reduction of damage, in particular damage to the eyes, of living beings, for example human beings such as pedestrians and/or bicyclists and/or drivers of motor vehicles, and/or animals, in the area of illumination of the light source by the invisible radiation outside the visible spectrum.

It is particularly advantageous to use the method described below in night vision systems in motor vehicles in which a video sensor that is sensitive at least in the near-infrared spectral region records the surrounding environment of the motor vehicle and displays this information to the driver. In contrast to the known methods, a minimum speed for the activation of the headlamp, and thus of the night vision system, is no longer required. Through the method described in the following, a night vision system can advantageously always be activated whenever a damage-free area is detected, i.e., a situation in which no living beings, in particular persons, are located in the damaging area. Particularly advantageously, the method described below contributes to a long life span of the light sources used, in particular the headlamps providing illumination at least in the near-infrared wavelength range (NIR headlamps), so that a high degree of availability of the light sources, and in particular of the night vision system, is provided.

A further advantage of the method described below is that a high degree of freedom is achieved in the design of a light source that radiates light having wavelengths outside the visible spectrum, in particular the design of an NIR headlamp. For example, the degrees of freedom in the design of the light source with respect to radiated power and/or used spectral region and/or illumination characteristic are high. This contributes in a particularly advantageous manner to a high degree of performance of the light source, in particular of the NIR headlamp, and thus of the night vision system, at a low cost.

It is particularly advantageous to use an infrared-sensitive sensor that recognizes the entering and/or the presence of a person in its detection area. Pyroelectric infrared sensors have proven suitable for this purpose.

It is particularly advantageous that, in addition to the infrared sensor, at least one ultrasound sensor and/or at least one radar sensor, which preferably operates in the wavelength range 24 GHz and/or 77 GHz, and/or at least one LIDAR sensor and/or at least one video sensor (video camera, camera) produces sensor signals, because the use of these sensors, already in use in the motor vehicle for other functions, results in low additional costs, since no additional components (hardware) are required.

The deactivation and/or activation of the light source dependent on the signal of an infrared sensor is advantageous, because this provides a simple and economical possibility for controlling the light source. In addition, the signal of at least one object recognition sensor for the deactivation/activation is advantageously added, a controlling of the light source being carried out when an object is recognized and infrared radiation is detected.

The controlling of the spatial and/or temporal intensity of the light of the light source dependent on the at least one sensor signal has the advantage that damage to present objects is reduced in a targeted manner, in that the spatial and/or temporal irradiation of the present objects, at least with light having wavelengths outside the visible spectrum of the light source, assumes a non-dangerous value, e.g. a value less than a predeterminable first boundary value. At the same time, the functionality of a night vision system equipped in this way is not limited in the other areas of acquisition. This contributes to a high degree of availability. For the realization, the signals of other distance-measuring sensors are used, with the aid of which it is possible to obtain both spatial information and also information concerning the temporal irradiation of the person.

The above-described advantages of the method correspondingly also hold for a device for improving visibility in a motor vehicle, as well as for the application of the device in a night vision system in a motor vehicle.

DETAILED DESCRIPTION

Figure 1:
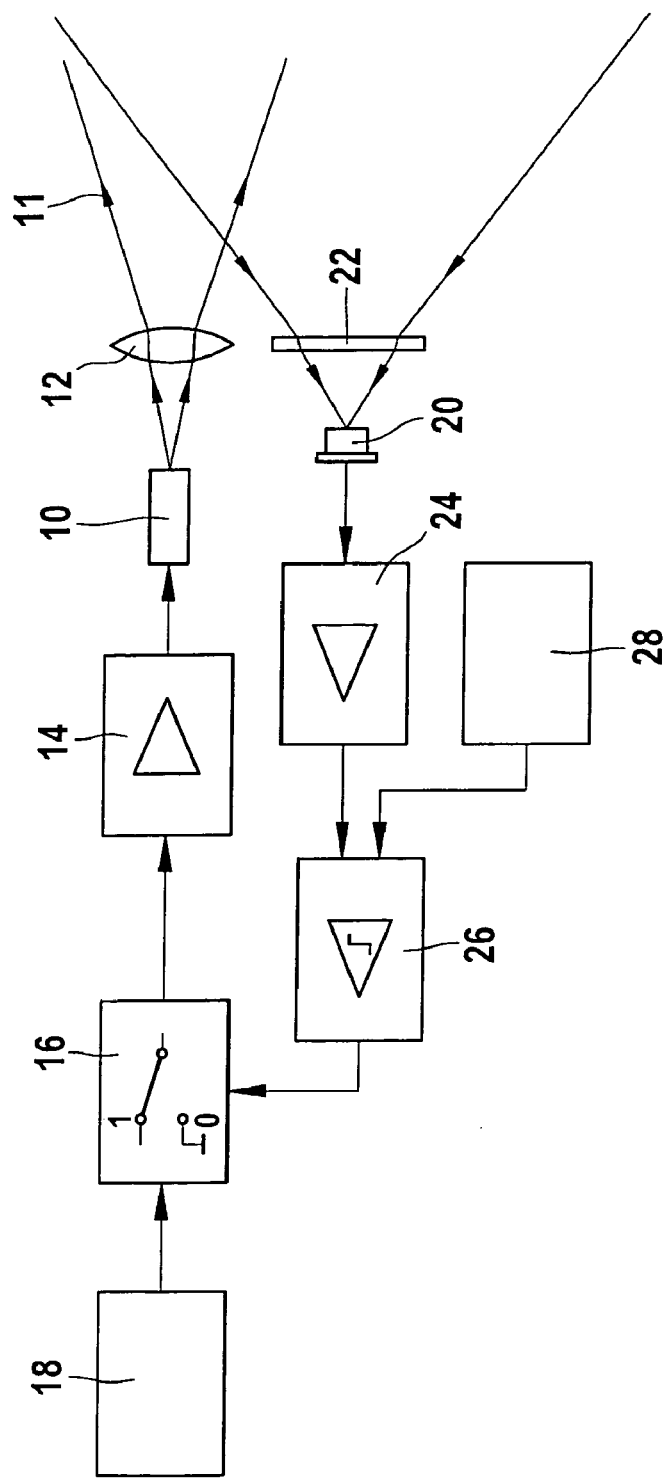
FIG. 1 shows a block diagram of the preferred exemplary embodiment.

In the following, a method and a device for improving visibility in a motor vehicle are described, in which a light source of the motor vehicle illuminates a particular area of illumination. At least one infrared sensor of the motor vehicle monitors the surrounding environment of the motor vehicle for the presence of persons or other living beings that give off heat (subsumed under "persons" in the following). The light source is here controlled dependent on the signals from the infrared sensor, being in particular activated or deactivated or controlled in such a way that the spatial and/or temporal irradiation of the detected present person, at least with light having wavelengths outside the visible spectrum, for example near-infrared light, lies in a range that is not dangerous to the person, being for example less than a predeterminable boundary value.

In the preferred exemplary embodiment, the space in front of two NIR headlamps of a night vision system of a motor vehicle are monitored by two infrared sensors that are allocated to the headlamps, and that are preferably built into the respective headlamp. In this way, persons situated in front of the NIR headlamps are detected, and the NIR headlamps are deactivated. Alternatively to the deactivation of the two NIR headlamps, it is also possible for only one headlamp to be deactivated, so that the night vision function of the night vision system remains available, at least to a limited extent.

In a variant of the preferred exemplary embodiment, alternatively to the deactivation of at least one NIR headlamp the power of the two NIR headlamps, or at least of one NIR headlamp, is reduced, so that there is no longer a risk of harming a detected person. Furthermore, a modification of the beam characteristic is alternatively or additionally carried out, for example through mechanical screening and/or optical elements. In a further variant of the preferred exemplary embodiment, the adjustment of the light source is carried out dependent on the critical time of action. The critical time of action is the time beyond which damage to the human eye is probable. This makes it possible that, dependent on the time of action, an adjustment of the light sources need not take place immediately, but rather can take place just before the critical time of action is reached. For the solutions, in addition to the signal of the infrared sensor, signals of at least one additional sensor that resolves distance and location (radio, video cameras, etc.) are used, on the basis of which an item of spatial information (where is the person located?) and an item of temporal information (radiation intensity over time at the corresponding distance) are obtained.

Examples of such additional sensors, used alongside the at least one infrared sensor, that are already present in the motor vehicle or whose use is at least known in the motor vehicle include for example park pilot sensors (PP sensors) based on ultrasound (ultrasound sensors), long-range radar sensors operating at 77 GHz, as are used for ACC (Adaptive Cruise Control), short-range radar sensors operating at 24 GHz, or LIDAR sensors. Alternatively, or in addition, a video sensor is used, in particular the already-installed video sensor of the night vision system. As mentioned above, these sensors are used in addition to the object recognition and/or distance measurement to the person recognized by the infrared sensor, in order to carry out the adjustment of the light source in a still more precise fashion.

FIG. 1 shows a block diagram of a device for improving visibility in motor vehicles. Here, as a light source a laser 10 is provided that radiates a laser beam 11 in the near-infrared range via an optical apparatus, e.g. at least one lens 12. On the basis of the infrared light reflected from the environment, a video camera can be used to present to the driver an improved image of the scene in front of the vehicle. Laser 10 is supplied with power from an energy source via an amplifier 14 and a switching element 16. In addition, an infrared sensor 20 is provided that is sensitive to infrared radiation, for example in the range from 4 to 6 μm or 8 to 12 μm. Here, the infrared radiation is coupled in via an additional optical apparatus, e.g. at least one lens 22, preferably a Fresnel lens. In the preferred exemplary embodiment, infrared sensor 20 is an infrared sensor that operates according to the pyroelectric principle. The signal emitted by the infrared sensor is supplied via an amplifier 24 to a comparator 26, in which the signal of the infrared sensor is compared with a reference signal from reference signal source 28. If the signal of the infrared sensor exceeds the reference value, it is to be assumed that a person is situated in the detection area of the infrared sensor. Comparator 26 emits a corresponding signal, which actuates switching element 16 so as to switch off laser 10. Laser 10 is here a part of the headlamp of the vehicle, and, depending on the embodiment, operates in pulsed fashion or in continuous-wave fashion. In the preferred specific embodiment, laser 10 is one or more laser diodes.

Instead of the pyroelectric infrared sensor, infrared sensors for heat radiation are also used that operate according to a different principle, e.g. semiconductor detectors, bolometers, thermopiles, etc.

Figure 2:
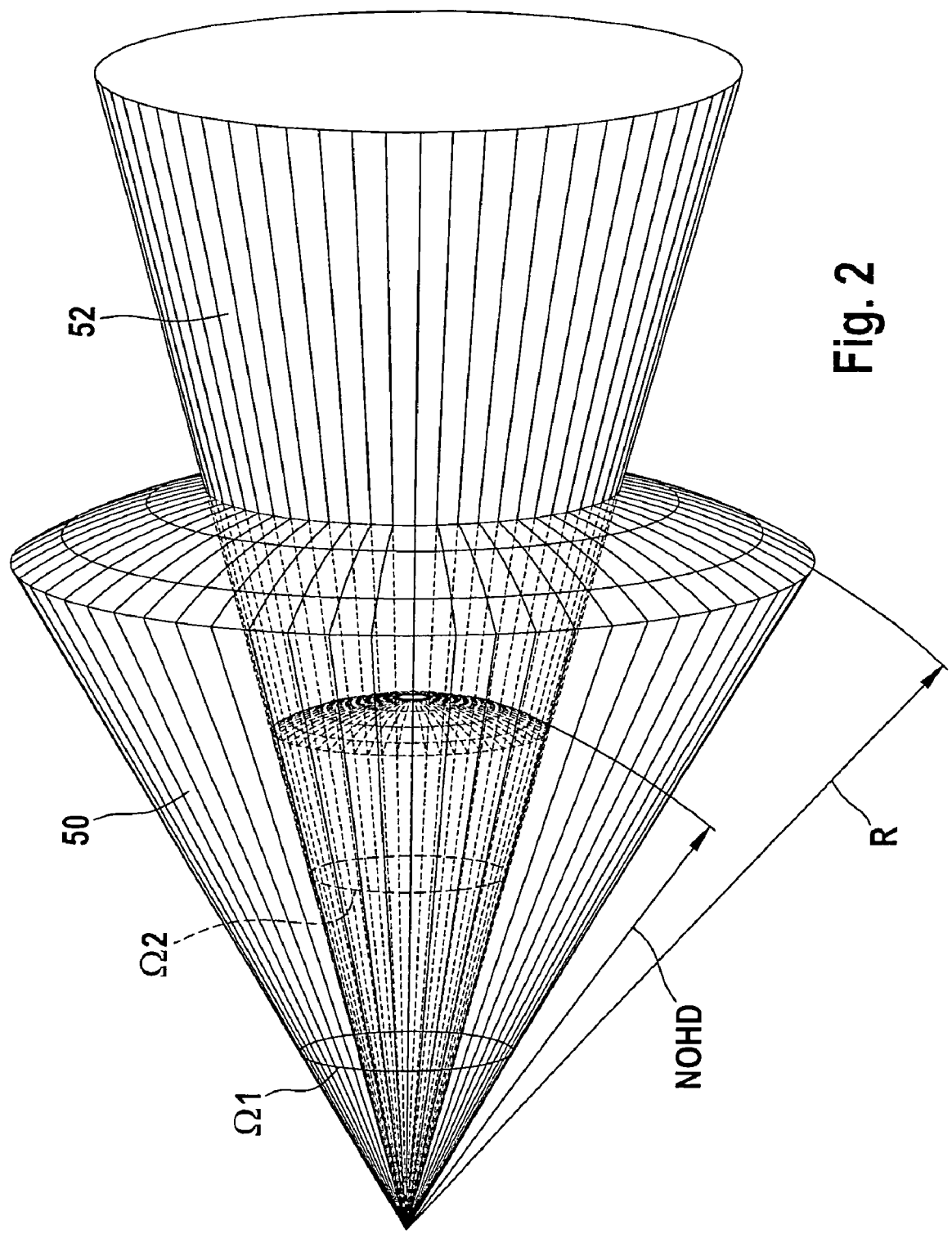
FIG. 2 shows the action of the system described in FIG. 1, on the basis of an exemplary laser beam.

FIG. 2 shows the action of the above-described measure. The infrared sensor (or the optical apparatus connected thereto) is here situated and dimensioned such that it monitors a predetermined area 50 that includes the complete diameter of laser beam 52. This monitoring area is defined by the detection range R of the sensor and by the angle $\Omega 1$. The dimensioning of the sensor, or of the optical apparatus connected in front of it, is here such that the range of the laser beam that can be dangerous to persons, in particular to the eyes, lies within the monitoring area. The area of danger is given here by the angle $\Omega 2$, which is determined by the opening angle of the laser beam, and by the distance NOHD (Nominal Ocular Hazard Distance), which is defined according to the strength and wavelength of the laser, within which there is a risk of damage when radiation beyond a particular degree takes place.

An advantage of the use of an infrared sensor that reacts to body heat is that the entry of other objects into the laser beam is ignored. However, many such infrared sensors react only to changes in the signal. For this reason, a lens system must be fixed in front of the infrared sensor such that when there is a change of position of a person a modulation of the signal received by the sensor takes place. In order for the infrared sensor also to recognize persons who are not moving, it is advantageous for the sensor to scan the environment. This takes place for example through a movable lens system that cyclically changes the area of acquisition of the sensor. Furthermore, in order to avoid false alarms or in order to improve the reliability of the infrared sensor, additional sensors are provided, for example radar sensors, cameras, etc., that recognize objects independently of the infrared sensor. Through the combination of the signals of the infrared sensor and at least one of the additional sensors, the entry or presence of a person in the danger area of the laser beam is recognized still more reliably, and is reacted to in an appropriate manner.

The described method and/or device for improving visibility in a motor vehicle operates in such a way that NIR headlamps and/or light sources that emit light having wavelengths outside the visible spectrum are automatically switched off when persons enter into the area of damage, and/or remain in this area for a longer period of time.

The described method and/or device are not limited to use in a night vision system using NIR headlamps. Rather, in addition to night vision functions the method and/or the device can also be used for other automotive functions that operate with light having wavelengths outside the visible spectrum, for example communication between two motor vehicles based on infrared light.

In a further variant, the described method and/or device are applied in the rear area of the motor vehicle, for example with the use of an infrared-based camera for travel in reverse.

In a further variant of the preferred exemplary embodiment, alternatively or in addition the at least one present object is warned by an acoustic and/or optical warning signal. In this variant, it is possible to warn humans in advance. Thus, an object detected at close vicinity can be warned acoustically, for example by a horn, or by optical signals using visible light, for example by a light alarm and/or a blinking warning light. If the object still remains in the area of damage after a certain latency period that is less than the critical time of action, the relevant light source, in particular the NIR headlamp of the night vision system, is then deactivated. The light source, in particular the NIR headlamp, is reactivated when the object leaves the area of damage and/or the first boundary value is again undershot. Here, the distance and position of the person, acquired through other sensors, can be used to calculate the intensity of irradiation.

What is claimed is:

1. A method for improving a visibility in a motor vehicle, comprising:
    illuminating an area by at least one light source of the motor vehicle through a first optical apparatus;
    producing a sensor signal by at least one infrared sensor of the motor vehicle, the sensor signal coupled through a second optical apparatus;
    comparing the sensor signal to a source signal supplied by an amplifier, the sensor signal and the source signal being compared in a comparator, wherein a greater value for the sensor signals indicates a person is situated in the area illuminated by the light source; and
    controlling the light source dependent on the sensor signal, wherein the light source is shut off by a corresponding signal sent by the comparator to an actuated switching element.

2. The method according to claim 1, wherein the at least one light source includes at least one of (a) a headlamp that illuminates at least in a near-infrared wavelength range, (b) a laser and (c) at least one laser diode that emits light at least in the near-infrared wavelength range.

3. The method according to claim 1, further comprising:
    producing sensor signals by at least one of (a) at least one ultrasound sensor, (b) at least one radar sensor that operates in at least one of the following wavelength ranges: 24 GHz and 77 GHz, and (c) at least one video sensor.

4. The method according to claim 1, further comprising:
    at least one of deactivating and activating the light source dependent on the sensor signal.

5. The method according to claim 1, wherein the light source is controlled dependent on the sensor signal in such a way that at least one of a spatial and temporal intensity of light of the light source assumes a value that is not dangerous to persons.

6. The method according to claim 1, further comprising:
    warning at least one present person by at least one of an acoustic and optical warning signal.

7. The method according to claim 1, wherein the sensor signal for controlling the light source is derived from the signal of the infrared sensor and from a signal of at least one additional sensor.

8. The method according to claim 1, wherein the infrared sensor is constructed in such a way that its detection area completely includes a beam of the light source, and its detection range is greater than a distance from the light source that results in eye damage.

9. The method according to claim 1, wherein the at least one infrared sensor includes a pyroelectric sensor.

10. The method according to claim 1, where in the first optical apparatus includes at least one lens.

11. The method according to claim 1, where in the second optical apparatus includes at least one lens.

12. The method according to claim 1, wherein the at least one infrared sensor includes a pyroelectric sensor, wherein the first optical apparatus includes at least one lens, and where in the second optical apparatus includes at least one lens.

13. The method according to claim 1, further comprising:
    producing sensor signals by at least one of (a) at least one ultrasound sensor, (b) at least one radar sensor that operates in at least one of the following wavelength ranges: 24 GHz and 77 GHz, and (c) at least one video sensor;
    at least one of deactivating and activating the light source dependent on the sensor signal;
    warning at least one present person by at least one of an acoustic and optical warning signal;
    wherein the at least one light source includes at least one of (a) a headlamp that illuminates at least in a near-infrared wavelength range, (b) a laser and (c) at least one laser diode that emits light at least in the near-infrared wavelength range,
    wherein the light source is controlled dependent on the sensor signal so that at least one of a spatial and temporal intensity of light of the light source assumes a value that is not dangerous to persons,
    wherein the sensor signal for controlling the light source is derived from the signal of the infrared sensor and from a signal of at least one additional sensor, and
    wherein the infrared sensor is constructed so that its detection area completely includes a beam of the light source, and its detection range is greater than a distance from the light source that results in eye damage.

14. The method according to claim 13, wherein the at least one infrared sensor includes a pyroelectric sensor, wherein the first optical apparatus includes at least one lens, and where in the second optical apparatus includes at least one lens.

15. A device for improving a visibility in a motor vehicle, comprising:
    at least one light source of the motor vehicle;
    a first optical apparatus through which the light source illuminates an area of illumination;
    at least one infrared sensor of the motor vehicle producing a sensor signal;
    a second optical apparatus, wherein the sensor signal is coupled through the second optical apparatus;

an amplifier to generate a source signal that is sent to the infrared sensor;

a comparator to compare the sensor signal to the source signal, wherein a greater value for the sensor signal indicates a person is situated in the area illuminated by the light source;

an actuated switching element that sends a corresponding signal to shutoff the light source when the person is situated in the area illuminated by the light source; and at least one control unit controlling the light source as a function of the sensor signal.

16. The device according to claim 15, wherein the device is used in a night vision system in the motor vehicle.

17. The device according to claim 15, wherein the device is applied in a rear area of the motor vehicle for use with an infrared-based camera.

* * * * *

UNITED STATES PATENT AND TRADEMARK OFFICE
CERTIFICATE OF CORRECTION

PATENT NO. : 7,667,585 B2  Page 1 of 1
APPLICATION NO. : 10/593144
DATED : February 23, 2010
INVENTOR(S) : Dominique Marchal It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 370 days.

Signed and Sealed this

Seventh Day of December, 2010

David J. Kappos
*Director of the United States Patent and Trademark Office*